United States Patent
Collinucci (12) 
(10) Patent No.: US 6,454,038 B2
(45) Date of Patent: *Sep. 24, 2002

(54) COLLAPSIBLE PANEL AND METHOD FOR CONTROLLED COLLAPSING THEREOF

(75) Inventor: Luciana Collinucci, Rimini (IT)

(73) Assignee: Certime Amsterdam B.V., Amsterdam (NL)

( * ) Notice: Subject to any disclaimer, the term of this patent is extended or adjusted under 35 U.S.C. 154(b) by 0 days.

This patent is subject to a terminal disclaimer.

(21) Appl. No.: 09/854,483

(22) Filed: May 15, 2001

Related U.S. Application Data (63) Continuation-in-part of application No. 09/288,498, filed on Apr. 8, 1999, now Pat. No. 6,250,412.

(30) Foreign Application Priority Data

Apr. 9, 1998 (EP) .............................. 98106645

(51) Int. Cl.[7] ................................................ B60D 1/28
(52) U.S. Cl. ...................................................... 180/271
(58) Field of Search ................................ 180/271, 282; 428/911, 912, 912.2; 244/129.3, 129.4; 296/84.1; 102/306–310

(56) References Cited

U.S. PATENT DOCUMENTS

| | | | |
|---|---|---|---|
| 3,738,681 A | 6/1973 | Wada et al. ................ 180/271 |
| 3,741,583 A | 6/1973 | Usui et al. | |
| 3,884,499 A | * 5/1975 | Oka et al. | |
| 4,301,707 A | 11/1981 | Schimmel et al. | |
| 4,637,848 A | 1/1987 | Ciaramitaro et al. ........... 149/2 |
| 5,318,145 A | * 6/1994 | Vollmer ...................... 180/274 |
| 5,323,872 A | 6/1994 | Yabe .......................... 180/271 |
| 5,486,019 A | 1/1996 | Chevroulet et al. ......... 180/271 |
| 5,490,887 A | 2/1996 | Cranney et al. ............... 149/2 |
| 5,954,296 A | * 9/1999 | Jahsman et al. ............ 244/121 |
| 6,250,412 B1 | * 6/2001 | Collinucci .................. 180/271 |
| 6,336,611 B1 | * 1/2002 | Collinucci ............... 244/129.4 |

FOREIGN PATENT DOCUMENTS

EP  0 805 073  11/1997

* cited by examiner

Primary Examiner—Daniel G. DePumpo
Assistant Examiner—Matt Luby
(74) Attorney, Agent, or Firm—Sughrue Mion, PLLC (57) ABSTRACT

A collapsible panel forming a separation structure between a generally closed inner environment and an outer environment, for instance consisting of a motorvehicle stratified window, incorporating within its mass at least one explosive charge to which an igniter/detonator device is operatively associated to produce detonation of the explosive charge so as to shiver the panel in a controlled way substantially within the plane thereof.

116 Claims, 5 Drawing Sheets

COLLAPSIBLE PANEL AND METHOD FOR CONTROLLED COLLAPSING THEREOF

The present application is a Continuation-in-Part of U.S. application Ser. No. 09/288,498, filed on Apr. 8, 1999, now U.S. Pat. No. 6,250,412.

BACKGROUND OF THE INVENTION

1. Field of the Invention

The present invention is related in general to panels forming a separation structure between a generally closed inner environment and an outer environment.

2. Discussion of the Related Art

In the present invention and in the appended claims the term "panel" is intended to designate any planar or even curved substantially sheet-like element, employed as a separating element between an inner and an outer environment in the fields of buildings and road and railway vehicles. Accordingly the term "panel" as used herein includes walls, partitions, diaphragms, architectural facades, plate glasses, windows, windscreens and the like which, secured to their supports, provide safety and protection from the outside, i.e. prevent intrusion of persons, objects, atmospheric agents, etc.

These panels however become in case of emergency an obstacle to the need of evacuation of people and things, for instance owing to a fire, a road or railway accident, gas leak, undesired door locking, insufficient escape ways in case of panic, etc. When the panel consists of a window of an armored car, generally comprising two or more sturdy glass sheets mutually joined together by a bonding agent, there is the serious problem that in case of accident or locking of the car doors and movable windows, the passengers may be trapped within the car without any chances of escape. As far as railway vehicles, for instance high-speed trains, are concerned, the window panels are held fixed and the access doors are located in critical areas, i.e. at the ends of the vehicle bodies which are most exposed to the consequences of crashes and thus to the risk of jamming. The trapping danger in case of accident is in this case evidently much higher.

In order to give a solution to the above problems, panel controlled self-elimination systems have been already proposed, providing panel collapsing by means of explosive micro-charges. The presently known proposals, with specific reference to windows for vehicles in general, substantially provide the following three solutions:

- the explosive charge, positioned at the outside or at the inside of the window, operates striking members which in turn produce embrittlement of the window (U.S. Pat. No. 5,318,145; EP-A-13529; FR-A-2096188; FR-A-2051580);
- the window, or a portion thereof, is circumscribed by an annular explosive string whose detonation produces window cutting or severing. This solution is particularly directed to transparent canopies of aircraft provided with pilot's ejectable seat (U.S. Pat. No. 4,301,707; FR-A-2140605; FR-A-2125588; FR-A-2077846; U.S. Pat. No. 3,670,998);
- pyrotechnic charges are applied to the support structure of the panel, for instance of an aircraft emergency door, so as to provide separation and outwardly ejection thereof (U.S. Pat. No. 4,407,468).

The above-listed solutions are all affected by the same critical drawback: detonation of the explosive charge produces a substantially uncontrolled panel deflagration with ejection of the panel as a whole, or of portions and fragments thereof, normally towards the outside of the environment delimited by the panel itself. Panel embrittlement with fragment ejection is absolutely dangerous and unacceptable, and owing to this reason the above-disclosed known solutions have not been significantly applied until today.

SUMMARY OF THE INVENTION

The object of the present invention is to overcome the above inconveniences, and to provide a collapsible panel and a method for the controlled elimination thereof in a safe way and substantially without any risks of ejection of parts of fragments thereof towards either the outer or the inner environment.

According to the invention this object is achieved essentially by virtue of a collapsible panel of the type set forth in the above, characterized in that it embodies within at least part of the mass thereof at least one explosive charge to which igniter and/or detonator means are operatively associated to operate detonation of the explosive charge so as to shiver the panel in a controlled way substantially within the plane thereof.

The explosive charge may be distributed over the panel plane, configured in a continuous band around the perimeter, or it may be concentrated in correspondence of a weak point thereof, particularly at a corner.

In either case breakage of the panel following piloted detonation of the explosive charge provides opening of an escape passage between the inner and outer environments in a prompt and efficient way, since the panel is reduced into very little incoherent fractions. In case the panel constitutes an element of a building structure, immediate generation of a passage even of a large size enables, for instance in case of supermarkets, banks and public offices, not only to prevent any obstacle to the crowd flow outwardly, but also to ensure quicker and easier interventions by the police and fire brigade whenever necessary, also unsheltering any aggressors which might employ, once having got in, those "barriers" like barricades. Still in case the collapsible panel is constituted by a building structure element even of a large size, such as for instance a glass wall, the invention provides incorporating within the panel a retaining filiform structure designed to hold the fragments of the panel itself following detonation of the explosive charge. In practice this turns the collapsed panel into a kind of incoherent curtain which prevents piling up of glass splinters and rubbles on the ground and which can be easily passed through.

Further advantageous applications of the panel according to the invention may consist for instance of fire barriers in building blocks constituted by a large amount of premises even arranged on several floors, or in road galleries. In the event of fire, piloting even by means of a remote control and also from several locations collapsing of a wise composition of such fire barriers may enable quickly circumscribing the fire, thus safeguarding in a short time people within the interested area, and warrants their moving away and rescue.

Still another particularly advantageous application of the collapsible panel according to the invention consists of car windows (lateral windows, windscreen, rear window) of motor vehicle, and in particular of armored cars. As it is known an armored car window is generally constituted by two or more sturdy glass sheets mutually bonded together: in case of accident or door locking, these windows would seal the passengers within the car. To the contrary, collapsing of the windows according to the principles of the invention, following detonation of explosive charges possibly in synchronism with operation of passive inertial safety systems which the car may be equipped with, immediately provides exit passageways for the car occupants towards the outside, i.e. passageways for succourers towards the interior of the car. In this application the window has normally a stratified conformation with at least a pair of glass sheets joined together, typically by means of a transparent bonding agent. In this case the explosive charge is conveniently provided according to the invention as a thin and also transparent layer, interposed between these sheets and embodied within the bonding agent. Obviously, in case the windows is formed by more sheets mutually coupled together, the explosive layer may be embodied in correspondence of the bonding areas between each pair of adjacent sheets. Detonation of the explosive charge, started by the associated igniter and/or detonator, immediately propagates between the window sheet layers, causing embrittlement thereof.

In case of armored tempered windows, the shock wave for collapsing thereof may be produced by an explosive microcharge concentrated in the weakest point of the panel, i.e. as already previously pointed out at a corner where two of its edges are merging. Splinter projection shall in this case be prevented by the usual polycarbonate or polyester film provided in correspondence of the glass surface facing towards the interior of the vehicle.

Explosives which can be employed in the collapsible panel according to the invention may simply consist of commonly employed gunpowder. In the case of windows and transparent panels in general a suitable explosive may be of the blasting gelatine, Dynamite Gomme A®, or Octogen® type, which are preferred for the present invention. However, the explosive may also be of the "water-gel" type which, besides being capable of activation in environments without air and even wet and underwater, is also transparent and resistant to temperature changes, namely has no instability problems due to insulation, green house effect and accidental shocks. Moreover this type of explosive is subjected neither to dulling over the time nor to detonation by sparks generated by projectile impact thereagainst.

The invention, defined in its essential elements in the appended claims, is directed besides the collapsible panel also to the method for controlled collapsing thereof.

BRIEF DESCRIPTION OF THE DRAWINGS

Embodiments of the invention will now be disclosed with reference to the accompanying drawings, purely provided by way of non limiting example, in which.

DETAILED DESCRIPTION OF THE INVENTION

The present invention will be explained in further detail by making reference to the accompanying drawings, which do not limit the scope of the invention in any way.

Figure 1:
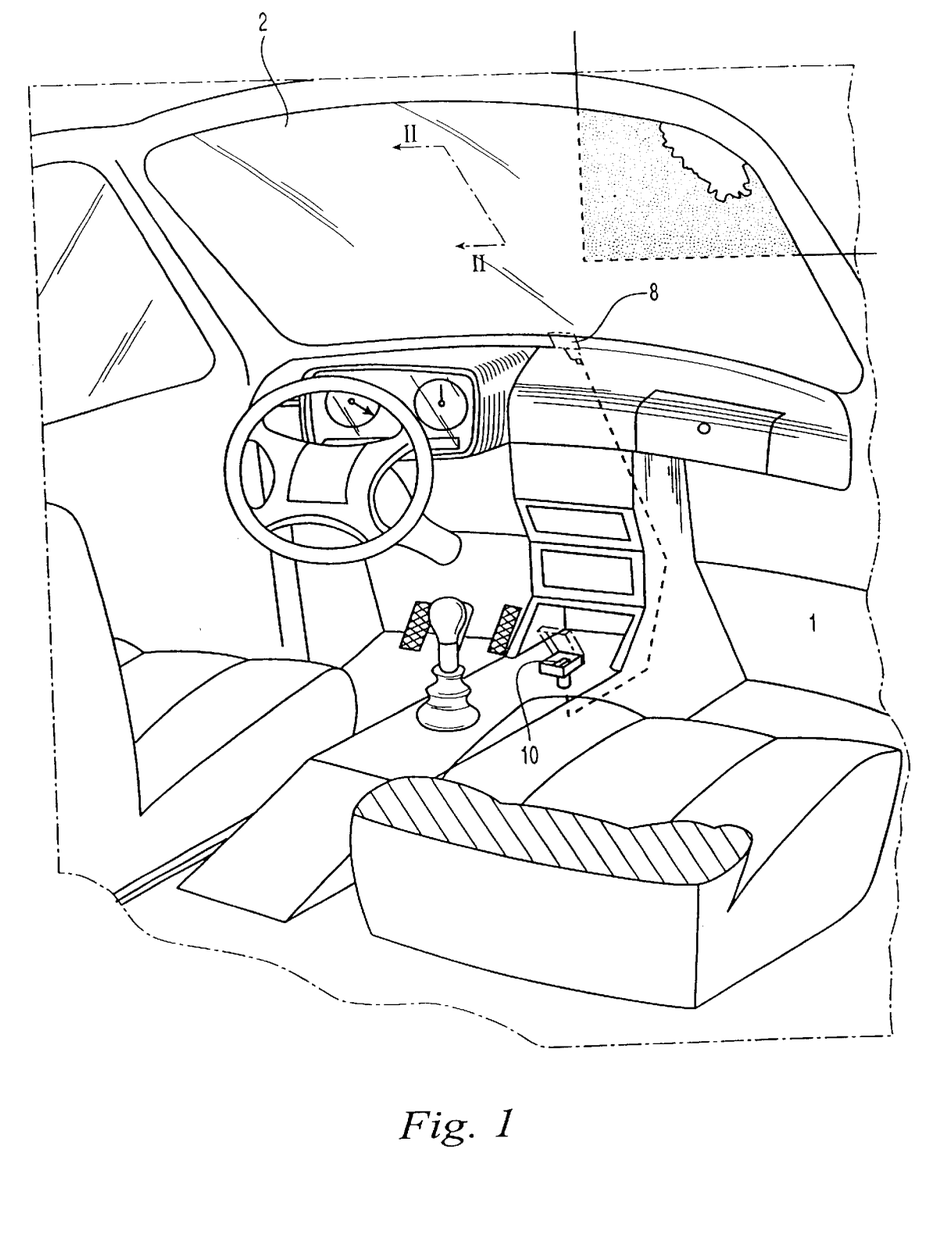
FIG. 1 is a diagrammatic perspective view showing the passenger compartment of an armored car whose windscreen is constituted by a collapsible panel according to the invention.
Figure 2:
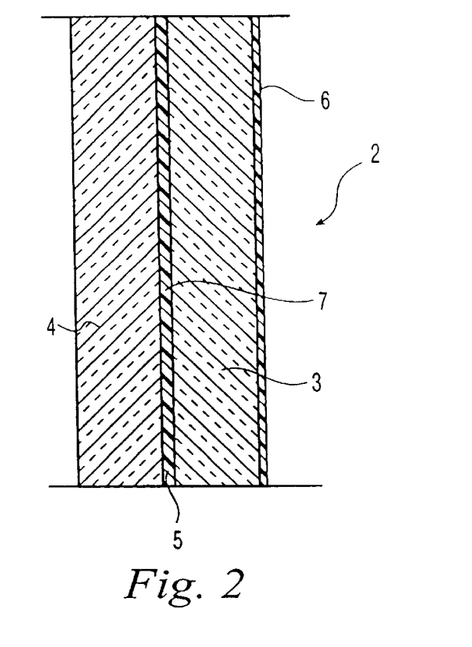
FIG. 2 is a sectioned and enlarged view along line II—II of FIG. 1.

Referring initially to FIGS. 1 and 2, reference numeral 1 designates the passenger compartment of an armored car having a windscreen 2 formed by two sturdy glass sheets 3,4 coupled together by an intermediate layer of a bonding agent 5, in a conventional way. A transparent polycarbonate or polyester film 6 may be, in the case of an armored window, applied to the surface of the inner glass sheet 3 facing towards the passenger compartment 1.

According to the invention the windshield 2 embodies within its mass an explosive charge: in the case of the shown example, i.e. in the case of two mutually coupled glass sheets, this explosive charge, shown as 7, is constituted by a uniform and transparent thin layer, incorporated within the bonding agent layer 5, of water-gel explosive, for instance of the type produced and marketed by NITROCHIMIE or by SARDA ESPLOSIVI INDUSTRIALI SPA.

In case of a multi-layer panel, i.e. in the case of windows or glass partitions formed by several sheets coupled to one another, an explosive charge 7 may be interposed between each layer of adjacent layers.

For activation of the explosive charge 7 an igniter is provided, which operates a detonator fuse of conventional type diagrammatically shown as 8 in FIG. 1, which is connected to a manually operable control device 9 provided with suitable safety protections (not shown in the drawings since within the skill of the practitioner) against accidental operation.

In case the car is equipped with inertial passive safety systems (air bag; safety belt pre-stretching device), the igniter 8 may be automatically actuated in a synchronized way with operation of these inertial systems. In this case a suitable delay device may be provided for possibly allowing de-activation of the igniter 8 by means of the manual control 10.

In case of crash or anyway of locking of the car doors, the windshield 2 according to the invention provides an immediate escape way following its controlled self-destruction upon detonation of the explosive charge 7. In this case in fact the combustion of the explosive charge rapidly propagates between the two sheets 3,4 causing micro-shivering thereof substantially within the plane of the window 2, such as partially depicted on top of the right side of the windshield 2 in FIG. 1. Ejection of any glass splinters or fragments towards the interior of the passenger compartment 1 is prevented by the inner film 6.

The explosive charge 7 may consist of usual gunpowders which, as it is known, can be activated even in the absence of air, and thus also in wet environment and underwater. The volume change caused by firing of the explosive charge and the combustion rapidity are both function of the type of selected explosive: in this connection the blasting gelatine, Dynamite Gomme A®, or Octogen® type explosives are presently considered as preferred explosives. Further, "water-gel" type explosives may be used, since this explosive is transparent and resistant to temperature variations, without any instability problems, due to insulation, green house effect and accidental shocks. Moreover such an explosive does not become dull over the time and is not activated by sparks produced by any projectile impact.

Naturally in case of non-transparent panels more common and promptly available explosives can be employed, such as for instance gunpowder, laminated plastic explosive and the like.

Figure 3:
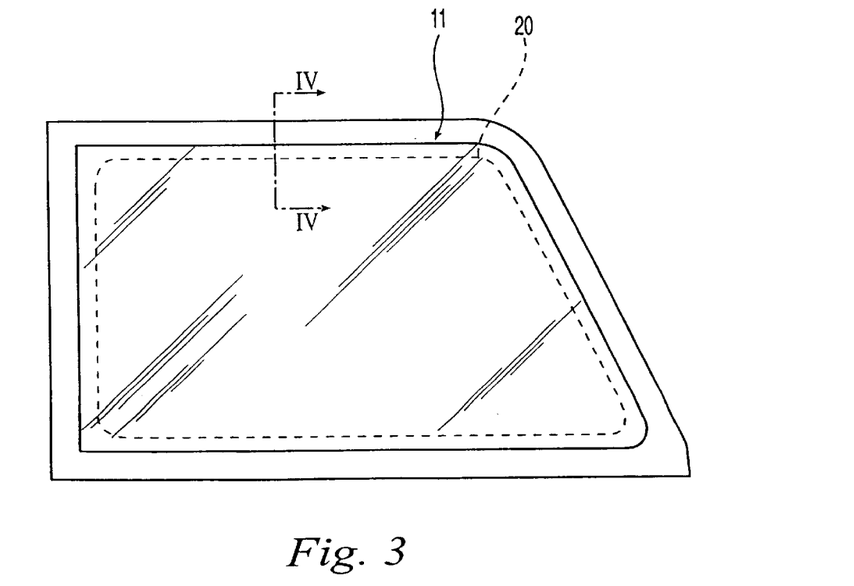
FIG. 3 is a diagrammatic elevational view of a side window of an armored car, also constituted by a collapsible panel according to the invention.
Figure 4:
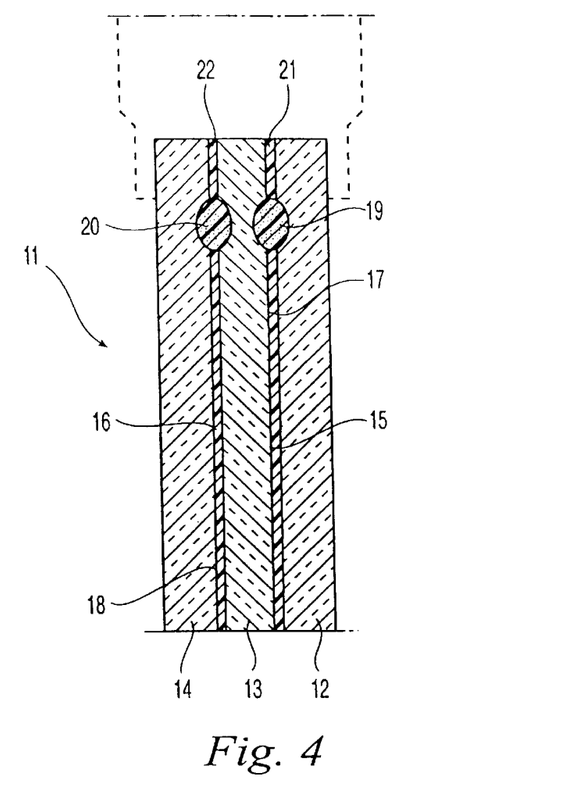
FIG. 4 is a sectioned and enlarged view along line IV—IV of FIG. 3.

FIGS. 3 and 4 show another example in which the collapsible panel according to the invention is transparent. In this case the panel is constituted by an armored side window 11 of a motorvehicle, formed by three sturdy glass sheets 12,13,14 mutually coupled by means of two intermediate layers of a bonding agent 15,16 in which respective thin layers of transparent explosive 17,18 are incorporated, designed to be both activated simultaneously by means of an igniter and/or detonator not shown in the drawings. In this embodiment peripheral annular channels 19, 20 may be provided between the sheets 12,13 and 13,14, respectively, housing respective explosive charges 21,22. Upon explosion of the charges 17,18, detonation of the annular charges 21,22 releases the window 11 thus collapsed from the vehicle structure to the aim of providing a fully open passageway from the interior of the passenger compartment outwardly and vice versa.

The same effect can be more conveniently achieved through provision of a greater thickness of the or each explosive charge 17,18 along the peripheral border of the window 11, which enables—besides detachment of the collapsed window from its support—making the explosion propagation speed more regular and fast.

It is to be pointed out that in case of armored tempered glass panels the shock wave for collapsing thereof may be generated, instead of an explosive charge distributed through the panel thickness over its plane, by a micro-charge concentrated in the weakest point of the structure, i.e. at the merging zone of two of its edges.

Figure 5:
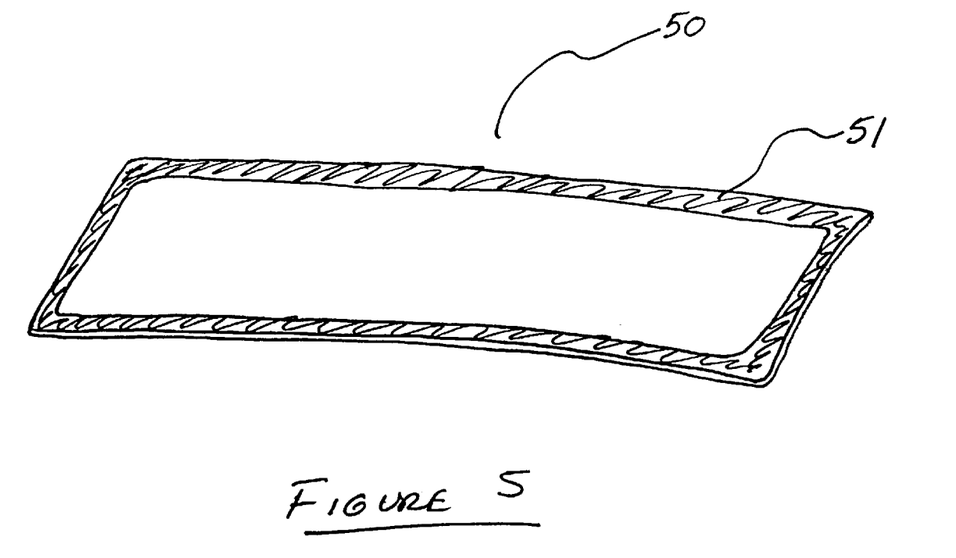
FIG. 5 is a diagrammatic perspective view of a windscreen of a vehicle manufacture in accordance with another embodiment of the present invention.
Figure 6:
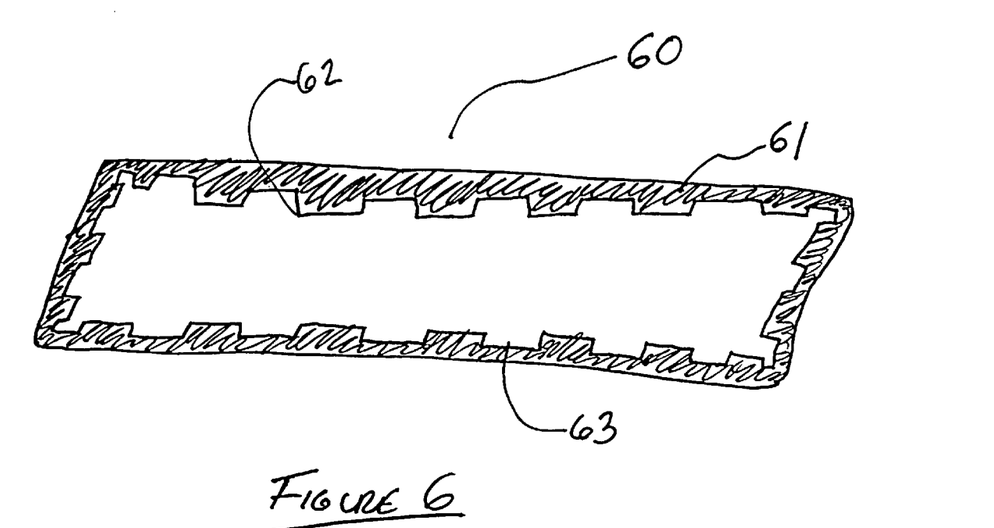
FIG. 6 is a view similar to FIG. 5, showing an alternate configuration of the embodiment of the present invention shown in FIG. 5, FIG. 7A diagrammatically shows another alternative configuration of the embodiment shown in FIG. 5, FIG. 7B diagrammatically shows an alternative configuration of the embodiment shown in FIG. 7A.

FIGS. 5 and 6 depict yet another embodiment of the present. In FIG. 5, a glass windscreen panel 50 is shown having a peripheral continuous band 51 of explosive charge as described earlier with regard to FIGS. 2–4. In this embodiment, a continuous band of explosive charge is placed around the entire periphery of the windscreen or panel, such that if the charge is placed on a windscreen or window of a vehicle it does not obstruct or interfere with sight when assembled with a vehicle. The explosive band can be hidden by portions of the vehicle body or frame. Further, in this embodiment, because the explosive charge is placed only around the perimeter of the panel it is not necessary for the explosive charge material to be transparent, and can be made from any commonly known or used explosive for this type of application. Although, if the explosive charge or panel is configured such that portions of the explosive charge would potentially interfere with sight lines of passengers or drivers of a vehicle the explosive can be made of transparent explosive material, as discussed previously.

The explosive peripheral band 51 may be placed on or in between multiple panels of a windscreen (as discussed earlier), and further, may be arranged and protected by the silk-screen prints (window tinting) usually provided in a known way over the panel perimeter. Moreover, it is possible to use known methods to incorporate color pigments in the explosive peripheral band 51, or use non-transparent explosive material (which is not sensitive to sunlight) so as to avoid the use of the window protective prints.

The area taken up by the explosive peripheral band 51 should be, but is not limited to, no more than approximately 25% of the entire surface area of the panel or window, and as shown in FIG. 6, the geometrical arrangement of the peripheral explosive band may be configured to increase, upon the detonation of the charge, the efficiency of the window collapsing. In the embodiment shown in FIG. 6, the peripheral explosive band 61 is shown having a series of fingers or protrusions 62 and indentations 63, such that the width of the band is uneven, to effectuate a more efficient collapsing of the window panel 60. Although the fingers 62 and indentations 63 shown in FIG. 6 are rectangular in shape, any other shape may generally be used to optimize collapsing of the window, including triangular, oval, etc. Further, it should be noted that it is not necessary for each of the fingers or indentations to be of equal size, but the sizes may be varied along the band so as to optimize panel collapse. Additionally, the local distribution or concentration (including thickness) of the explosive band may vary along the peripheral band so as to optimize the blasting efficiency of the band.

When the panel 50 or 60 is a laminated panel or window (as often used in vehicles) which has at least two panels (glass panels in vehicles) which have an intermediate reinforcing layer of a plastic material (transparent in a vehicle window), the peripheral explosive band may be designed and configured so as to destroy also the intermediate reinforcing layer while producing breakage of the outer panels, or sheets.

Figure 7A:
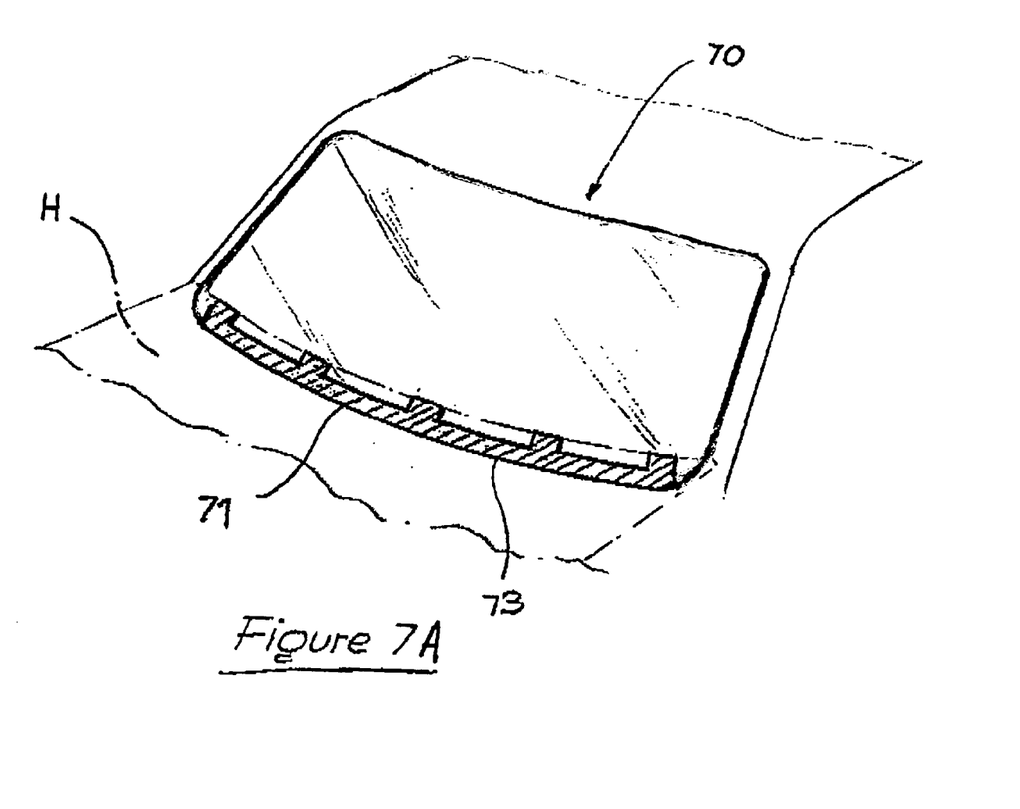

FIG. 7A shows yet another embodiment of the present invention, where a vehicle windscreen 70 having a non-transparent (although a transparent explsoive may be used) explosive band 71 with an indented arrangement as shown in FIG. 6, provided only along the lower edge of the window. This lower edge of the window is covered and hidden from view by the vehicle body, namely the front of the hood H. This allows the band 71 to be protected from outer agents (weather) without the need of silk-screen printing on the windscreen, or similar expedients, although these may be used for additional protection. It should be noted that although the band 71 is depicted along the bottom of the windscreen, the band may also be provided along the top of the windscreen only, or both the top and bottom, and/or along the sides of the windscreen.

Figure 7B:
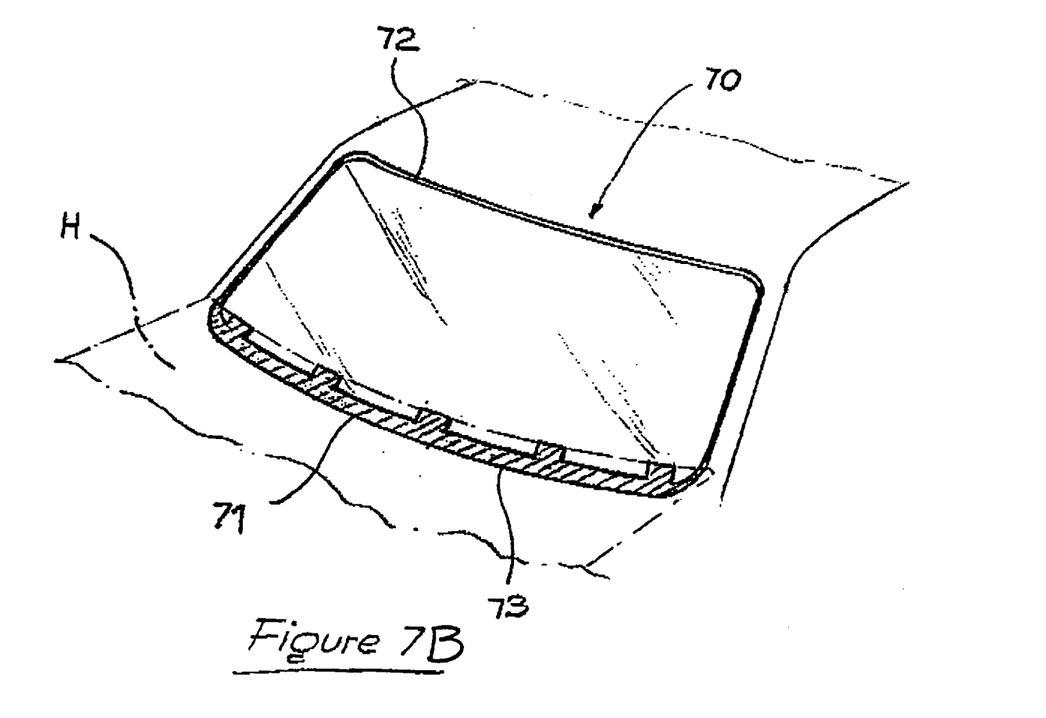

Another embodiment of the present invention is shown in FIG. 7B. This embodiment is similar to that shown in FIG. 7A, except that the explosive band 71 is connected to a thin explosive ribbon 72 which is provided continuously along the remaining three edges of the windscreen 70 so as to form generally a "U" shaped explosive band. In this embodiment, it is preferred that the ribbon 72 be "U" shaped so as extend along the remaining three edges of the windscreen 70. In this embodiment, when the charge is blasted the lower band 71 will cause shivering or cracking of the window plane, while the ribbon 72 will provide severing and separation of the related window edges from the vehicle body, thus enabling easier elimination of the panel. Blasting of the ribbon 72 may either occur simultaneously with or subsequently to blasting of the band 71.

Further, in either embodiments discussed above regarding FIGS. 7A and 7B, the conventional windscreen arrangement or dimensions may be modified by the addition of a lower (or upper) extension 73 for receiving the explosive band 71. This would effectively increase the size of prior art windscreens to allow for the positioning of the band 71 out of the field of the view of the passengers in the vehicle, and to be adequately hidden by the body of the vehicle, particularly when a non-transparent explosion is used.

It is to be pointed out that the embodiments disclosed with reference to the drawings only constitute a limited number of possible applications of the invention, whose practical working can be advantageously extended to any separation structure between one and another environments.

In case of application to a collective transportation vehicle, for instance a bus or a railway body, all windows thereof may consist of transparent panels according to the invention, pre-mounted within respective metal or plastic material frames in turn fixed to the vehicle structure, each frame carrying an igniter device for the explosive charge embodied in the respective windows. These igniter devices may also be designed to be simultaneously actuated, both from the interior and from the outside of the vehicle, by means of a suitable key-tool designed to be inserted into a well visible and accessible operating socket. Accordingly escape of the passengers outwardly and entrance of rescue people inwardly of the vehicle shall be immediate and through a number of passageways simultaneously.

Additional examples of advantageous embodiments of the invention may consist of submerged swing doors and diaphragm which cannot open owing to piezometric load, designed to be collapsed so as to perform the task of quick opening safety valves to prevent damages of hydraulic plants (for instance of a hydroelectric installation) in case of anomalous overpressure. Further embodiments may consist of walls or windows or large doors with piloted function of anti-panic collapsing.

Naturally the details of construction and the embodiments may be widely varied with respect to what has been disclosed and illustrated, without thereby departing from the scope of the present invention such as defined in the appended claims.

What is claimed is:

1. A method for eliminating a collapsible panel forming a separation structure, said method comprising the following steps:
   providing within at least part of a panel an explosive band, wherein said explosive band is continuous and positioned along a perimeter of said panel; and
   piloting detonation of said explosive band.

2. The method according to claim 1, wherein said panel has at least a pair of sheets joined to each other, and wherein said explosive band is provided as a thin layer interposed between said sheets.

3. The method according to claim 2, wherein said sheets are joined together by means of a bonding agent and said explosive band is embodied within said bonding agent.

4. The method according to claim 1, wherein said explosive band has a plurality of fingers and indentations along said explosive band.

5. The method according to claim 1, wherein said explosive band is transparent.

6. The method according to claim 1, wherein the panel is a vehicle window.

7. The method according to claim 6, wherein the explosive band is transparent.

8. The method according to claim 6, wherein said vehicle is equipped with inertial passive safety means, and detonation of said explosive band is piloted in dependence of actuation of said passive safety means.

9. The method according to claim 8, wherein detonation of said explosive band is piloted with a delay with respect to operation of said passive safety means so as to enable manual de-activation of said explosive band.

10. The method according to claim 6, wherein at least portions of said explosive band are hidden from sight by portions of the vehicle.

11. The method according to claim 1, wherein said explosive band has an uneven thickness along at least one of a width and a length of said explosive band.

12. The method according to claim 1, wherein said explosive band has an uneven width along a length of said explosive band.

13. The method according to claim 1, wherein said explosive band is protected by a silk-screen printing on said panel.

14. The method according to claim 1, wherein said explosive band includes color pigments.

15. The method according to claim 1, wherein a surface area of said explosive band is up to approximately 25 percent of a surface area of said panel.

16. The method according to claim 6, wherein a surface area of said explosive band is up to approximately 25 percent of a surface area of said panel.

17. The method according to claim 1, wherein said explosive charge has a width which is substantially constant throughout the perimeter of said explosive band.

18. A collapsible panel forming a separation structure between a generally closed inner environment and an outer environment, said panel comprising:
   a planar member; and
   at least one explosive band to which igniter/detonator means is operatively associated to operate detonation of said explosive band so as to shiver said planar member in a controlled way substantially within a plane thereof, wherein said explosive band is distributed continuously around a perimeter of the planar member.

19. The panel according to claim 18, wherein said planar member has at least a pair of sheets joined to each other, and wherein said explosive band is provided as a thin layer interposed between said sheets.

20. The panel according to claim 19, wherein said sheets are joined together by means of a bonding agent and said explosive band is embodied within said bonding agent.

21. The panel according to claim 18, wherein said explosive band has a plurality of fingers and indentations along said explosive band.

22. The panel according to claim 18, wherein said explosive band is transparent.

23. The panel according to claim 18, wherein the planar member is a vehicle window.

24. The panel according to claim 23, wherein the explosive band is transparent.

25. The panel according to claim 23, wherein said vehicle is equipped with inertial passive safety means, and detonation of said explosive band is piloted in dependence of actuation of said passive safety means.

26. The panel according to claim 25, wherein detonation of said explosive band is piloted with a delay with respect to operation of said passive safety means so as to enable manual de-activation of said explosive band.

27. The panel according to claim 23, wherein at least portions of said explosive band are hidden from sight by portions of the vehicle.

28. The panel according to claim 18, wherein said explosive band has an uneven thickness along at least one of a width and a length of said explosive band.

29. The panel according to claim 18, wherein said explosive band has an uneven width along a length of said explosive band.

30. The panel according to claim 18, wherein said explosive band is protected by a silk-screen printing on said planar member.

31. The panel according to claim 18, wherein said explosive band includes color pigments.

32. The panel according to claim 18, wherein a surface area of said explosive band is up to approximately 25 percent of a surface area of said planar member.

33. The panel according to claim 23, wherein a surface area of said explosive band is up to approximately 25 percent of a surface area of said planar member.

34. The panel according to claim 18, wherein said explosive charge has a width which is substantially constant throughout the perimeter of said explosive band.

35. A vehicle provided with at least one collapsible panel comprising:
a planar member; and
at least one explosive band to which igniter/detonator means is operatively associated to operate detonation of said explosive band so as to shiver said planar member in a controlled way substantially within a plane thereof, wherein said explosive band is distributed continuously around a perimeter of the planar member.

36. The vehicle according to claim 35, wherein said planar member has at least a pair of sheets joined to each other, and wherein said explosive band is provided as a thin layer interposed between said sheets.

37. The vehicle according to claim 36, wherein said sheets are joined together by means of a bonding agent and said explosive band is embodied within said bonding agent.

38. The vehicle according to claim 35, wherein said explosive band has a plurality of fingers and indentations along said explosive band.

39. The vehicle according to claim 35, wherein said explosive band is transparent.

40. The vehicle according to claim 35, wherein the planar member is a window in said vehicle.

41. The vehicle according to claim 40, wherein the explosive band is transparent.

42. The vehicle according to claim 40, wherein said vehicle is equipped with inertial passive safety means, and detonation of said explosive band is piloted in dependence of actuation of said passive safety means.

43. The vehicle according to claim 42, wherein detonation of said explosive band is piloted with a delay with respect to operation of said passive safety means so as to enable manual de-activation of said explosive band.

44. The vehicle according to claim 40, wherein at least portions of said explosive band are hidden from sight by portions of the vehicle.

45. The vehicle according to claim 35, wherein said explosive band has an uneven thickness along at least one of a width and a length of said explosive band.

46. The vehicle according to claim 35, wherein said explosive band has an uneven width along a length of said explosive band.

47. The vehicle according to claim 35, wherein said explosive band is protected by a silk-screen printing on said planar member.

48. The vehicle according to claim 35, wherein said explosive band includes color pigments.

49. The vehicle according to claim 35, wherein a surface area of said explosive band is up to approximately 25 percent of a surface area of said planar member.

50. The vehicle according to claim 40, wherein a surface area of said explosive band is up to approximately 25 percent of a surface area of said planar member.

51. The vehicle according to claim 35, wherein said explosive charge has a width which is substantially constant throughout the perimeter of said explosive band.

52. A method for eliminating a collapsible panel forming a separation structure, said method comprising the following steps:

providing along at least one edge of a panel an explosive band, wherein said explosive band is continuous; and
piloting a detonation of said explosive band.

53. The method according to claim 52, wherein said panel has at least a pair of sheets joined to each other, and wherein said explosive band is provided as a thin layer interposed between said sheets.

54. The method according to claim 53, wherein said sheets are joined together by means of a bonding agent and said explosive band is embodied within said bonding agent.

55. The method according to claim 52, wherein said explosive band has a plurality of fingers and indentations along said explosive band.

56. The method according to claim 52, wherein said explosive band is transparent.

57. The method according to claim 52, wherein the panel is a vehicle window.

58. The method according to claim 57, wherein the explosive band is transparent.

59. The method according to claim 57, wherein said vehicle is equipped with inertial passive safety means, and detonation of said explosive band is piloted in dependence of actuation of said passive safety means.

60. The method according to claim 59, wherein detonation of said explosive band is piloted with a delay with respect to operation of said passive safety means so as to enable manual de-activation of said explosive band.

61. The method according to claim 57, wherein at least portions of said explosive band are hidden from sight by portions of the vehicle.

62. The method according to claim 52, wherein said explosive band has an uneven thickness along at least one of a width and a length of said explosive band.

63. The method according to claim 52, wherein said explosive band has an uneven width along a length of said explosive band.

64. The method according to claim 52, wherein said explosive band is protected by a silk-screen printing on said panel.

65. The method according to claim 52, wherein said explosive band includes color pigments.

66. The method according to claim 52, wherein said explosive charge has a width which is substantially constant throughout the perimeter of said explosive band.

67. The method according to claim 52, further comprising providing an explosive ribbon along at least one of the remaining edges of said panel.

68. The method according to claim 67, wherein said explosive ribbon is U shaped and provided along the remaining edges of said panel.

69. A collapsible panel forming a separation structure between a generally closed inner environment and an outer environment, said panel comprising:
a planar member; and
at least one explosive band to which igniter/detonator means is operatively associated to operate detonation of said explosive band so as to shiver said planar member in a controlled way substantially within a plane thereof, wherein said explosive band is distributed continuously along at least one edge of the planar member.

70. The method according to claim 69, wherein said planar member has at least a pair of sheets joined to each other, and wherein said explosive band is provided as a thin layer interposed between said sheets.

71. The method according to claim 70, wherein said sheets are joined together by means of a bonding agent and said explosive band is embodied within said bonding agent.

72. The method according to claim 69, wherein said explosive band has a plurality of fingers and indentations along said explosive band.

73. The method according to claim 69, wherein said explosive band is transparent.

74. The method according to claim 69, wherein the planar member is a vehicle window.

75. The method according to claim 74, wherein the explosive band is transparent.

76. The method according to claim 74, wherein said vehicle is equipped with inertial passive safety means, and detonation of said explosive band is piloted in dependence of actuation of said passive safety means.

77. The method according to claim 76, wherein detonation of said explosive band is piloted with a delay with respect to operation of said passive safety means so as to enable manual de-activation of said explosive band.

78. The method according to claim 74, wherein at least portions of said explosive band are hidden from sight by portions of the vehicle.

79. The method according to claim 69, wherein said explosive band has an uneven thickness along at least one of a width and a length of said explosive band.

80. The method according to claim 69, wherein said explosive band has an uneven width along a length of said explosive band.

81. The method according to claim 69, wherein said explosive band is protected by a silk-screen printing on said planar member.

82. The method according to claim 69, wherein said explosive band includes color pigments.

83. The method according to claim 69, wherein said explosive charge has a width which is substantially constant throughout the perimeter of said explosive band.

84. The method according to claim 69, further comprising providing an explosive ribbon along at least one of the remaining edges of said planar member.

85. The method according to claim 84, wherein said explosive ribbon is U shaped and provided so as to cover said at least one of the remaining edges of said planar member.

86. A vehicle provided with at least one collapsible panel comprising:

a planar member; and at least one explosive band to which igniter/detonator means is operatively associated to operate detonation of said explosive band so as to shiver said planar member in a controlled way substantially within a plane thereof, wherein said explosive band is distributed continuously along at least one edge of the planar member.

87. The vehicle according to claim 86, wherein said planar member has at least a pair of sheets joined to each other, and wherein said explosive band is provided as a thin layer interposed between said sheets.

88. The vehicle according to claim 87, wherein said sheets are joined together by means of a bonding agent and said explosive band is embodied within said bonding agent.

89. The vehicle according to claim 86, wherein said explosive band has a plurality of fingers and indentations along said explosive band.

90. The vehicle according to claim 86, wherein said explosive band is transparent.

91. The vehicle according to claim 86, wherein the planar member is a window in said vehicle.

92. The vehicle according to claim 91, wherein the explosive band is transparent.

93. The vehicle according to claim 91, wherein said vehicle is equipped with inertial passive safety means, and detonation of said explosive band is piloted in dependence of actuation of said passive safety means.

94. The vehicle according to claim 93, wherein detonation of said explosive band is piloted with a delay with respect to operation of said passive safety means so as to enable manual de-activation of said explosive band.

95. The vehicle according to claim 91, wherein at least portions of said explosive band are hidden from sight by portions of the vehicle.

96. The vehicle according to claim 86, wherein said explosive band has an uneven thickness along at least one of a width and a length of said explosive band.

97. The vehicle according to claim 86, wherein said explosive band has an uneven width along a length of said explosive band.

98. The vehicle according to claim 86, wherein said explosive band is protected by a silk-screen printing on said planar member.

99. The vehicle according to claim 86, wherein said explosive band includes color pigments.

100. The vehicle according to claim 86, wherein said explosive charge has a width which is substantially constant throughout the perimeter of said explosive band.

101. The vehicle according to claim 86, further comprising providing an explosive ribbon along at least one of the remaining edges of said planar member.

102. The vehicle according to claim 86, wherein said explosive ribbon is U shaped and provided along the remaining edges of said planar member.

103. A vehicle windscreen, comprising:

a planar member;

at least one explosive band to which igniter/detonator means is operatively associated to operate detonation of said explosive band so as to shiver said planar member in a controlled way substantially within a plane thereof, wherein said explosive band is distributed continuously along at least one edge of said planar member; and at least one explosive ribbon to which said igniter/detonator means is also operatively associated to operate detonation of said explosive ribbon, wherein said ribbon is distributed continuously along at least one of the remaining edges of said planar member.

104. The vehicle windscreen of claim 103, wherein said at least one explosive ribbon is integrally connected to said at least one explosive band.

105. The vehicle windscreen of claim 103, wherein said explosive ribbon is U shaped and is provided along the remaining edges of said planar member.

106. The vehicle windscreen of claim 103, wherein said planar member has an extension to which said explosive band is attached so as to be removed from view by a portion of a vehicle.

107. The vehicle windscreen of claim 103, wherein said planar member has at least a pair of sheets joined to each other, and wherein said explosive band is provided as a thin layer interposed between said sheets.

108. The vehicle windscreen of claim 107 wherein said sheets are joined together by means of a bonding agent and said explosive band is embodied within said bonding agent.

109. The vehicle windscreen of claim 103, wherein said at least one of said explosive band and said explosive ribbon are transparent.

110. The vehicle windscreen of claim 103, wherein said vehicle is equipped with inertial passive safety means, and detonation of said explosive band is piloted in dependence of actuation of said passive safety means.

111. The vehicle windscreen of claim 110, wherein detonation of said explosive band is piloted with a delay with respect to operation of said safety means so as to enable manual de-activation of said explosive band.

112. The vehicle windscreen of claim 103, wherein said explosive band has an uneven thickness along said explosive band.

113. The vehicle windscreen of claim 103, wherein said explosive band has an uneven width along said explosive band.

114. The vehicle windscreen of claim 103, wherein at least one of said explosive band and said explosive ribbon is protected by a silk-screen printing on said planar member.

115. The vehicle windscreen of claim 103, wherein at least one of said explosive band and said explosive ribbon includes color pigments.

116. The vehicle windscreen of claim 103, wherein said explosive band has a plurality of fingers and indentations along said explosive band.

* * * * *